United States Patent Office 3,784,585
Patented Jan. 8, 1974

3,784,585
WATER-DEGRADABLE RESINS CONTAINING RECURRING, CONTIGUOUS, POLYMERIZED GLYCOLIDE UNITS AND PROCESS FOR PREPARING SAME
Edward Emil Schmitt, Norwalk, Tzeng Jiueq Suen, New Canaan, and Ivor Heberling Updegraff, Stamford, Conn., assignors to American Cyanamid Company, Stamford, Conn.
No Drawing. Filed Oct. 21, 1971, Ser. No. 191,465
Int. Cl. C08f 21/02
U.S. Cl. 260—861
9 Claims

ABSTRACT OF THE DISCLOSURE

This invention provides water-degradable or hydrolyzable thermoplastic or thermoset resins containing blocks of polyglycolic acid units and to a process for preparing the same. More particularly, the invention provides a process relating to the copolymerization of either a resinous prepolymer or a polymerizable monomer with glycolide to produce a plurality of contiguous glycolic acid units which renders the resultant polymer containing such polyglycolic acid units water-degradable. Still more particularly, the invention provides a thermoplastic or resinous polymeric material manufactured by introducing of from about 2% to about 35%, by weight, of glycolide into either a polymerizable monomer or resinous prepolymer and effecting block copolymerization so as to obtain a water-degradable polymeric material. Resultant resin containing recurring, contiguous, polymerized glycolide units finds utility as a disposable packaging material or as a slow release encapsulating material for insecticides and medicinals, thickening agents, and surfactants for food packaging.

As is known, resins which are employed for packaging or coating purposes are, generally, not water-degradable. Water or moisture would adversely affect such resins and quickly render them unusable. Thus, resins which are water-soluble are avoided as packaging, coating, or fiber-forming materials, unless this property were desired. However, many resins, as for example, the well-known class of polyester resins prepared by reacting a polyhydric alcohol with a polycarboxylic acid, present contradictory considerations. On the one hand, a resin, such as a polyester, contains ester groups which contribute both to the build-up of high molecular weight species and to the "polar" nature of the polymer. This "polar" characteristic is essential for the orientation of the molecules in the polymer. Further, the polar nature of the polymer is involved in the mechanism of crystallinity and water regain. On the other hand and in contradistinction, the degree of hydrophobicity of the intermediate hydrocarbon units and atoms between the ester linkages must be considered. The hydrocarbon-based backbone reduces the tendency for the ester links to absorb too much water and subsequently hydrolyze. Therefore, the hydrophobic backbone stabilizes the high molecular weght polyester against breakdown during either exposure to moisture or washing. Hydrolytically unstable polyesters are generally not desired for most uses.

As is also known, hydrophilic polymers, such as polyvinyl alcohols which are water-soluble when nonoriented, have been prepared. Films have been prepared from these high molecular weight materials but do not possess the desirable properties generally attributed to hydrophobic polyester resins, such as high tensile strength, high tear strength, resistance to water, and the like.

Attainment of high molecular weights in polyester resins as packaging materials necessitates the removal essentially of all the water of condensation evolved during polymerization. There then arises an anomaly when one desires to prepare high molecular weight hydrophilic polymers, since it is more difficult to remove water from a hydrophilic material that holds water tenaciously. Hence, it would be highly desirable to prepare high molecular weight, water-degradable polymers of desired properties which have affinity toward water. A long-felt need in the art would then be fulfilled.

It is, therefore, a principal object of the invention to prepare high molecular weight polymeric materials which are hydrophobic, yet water-degradable. It is a further object of the invention to provide a high molecular weight polymeric material which is water-degradable and is of good strength and toughness. Other objects will become apparent from a consideration of the ensuing description.

To this end, it has been unexpectedly found that any polymerizable thermoplastic or thermoset resinous material can be modified so as to render it water-degradable. This is accomplished by the incorporation of minor quantities of polyglycolic acid units which are contiguously attached to the ends of prepolymer molecules or are set within a copolymer system without adversely affecting the unmodified resin's overall inherent physical properties.

According to the process of the invention, there is prepared a prepolymer of any polymerizable thermoplastic or thermoset resin having a molecular weight of at least 10,000 to which glycolide is added to form a polymer chain with recurring, contiguous, polymerized units of the structure:

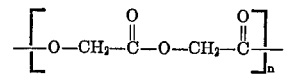

where $n$ is an integer of from 1 to 250. Resultant overall polymeric materials are characterized as being water-degradable after prolonged exposure to an aqueous environment. Usually, from about 2% to about 35% and, preferably, from about 5% to about 15%, by weight, of glycolide based on the weight of the prepolymer or polymerizable monomer are incorporated to obtain a polymer of good physical properties, yet capable of being hydrolyzed by water.

There can be employed as the prepoymer, a broad class of thermoset or thermoplastic resins. Illustrative of one class of such resins are the polyester resins. The latter are well known in the art and are prepared by reacting a polycarboxylic acid or the anhydride thereof with a polyhydric alcohol. More specifically, the resin can be prepared using a procedure wherein at least one of the reactive components contains $\alpha,\beta$-ethylenically unsaturated di- or tricarboxylic acids. Resinous, essentially linear esterification or condensation products containing a plurality of ethylenically unsaturated linkages distributed along the backbones of their polymer chains are thereby produced. It is preferred to employ such $\alpha,\beta$-ethylenically unsaturated dicarboxylic acids as maleic, fumaric, citraconic, $\alpha,\alpha$-dimethylcitraconic, mesaconic, itaconic, $\alpha$-methylitaconic, $\alpha$-methylitaconic, teraconic, and the like, as well as mixtures thereof, but minor amounts of $\alpha,\beta$-ethylenically unsaturated polycarboxylic acids containing three or more carboxyl groups, such as aconitic acid and the like, together with the particular $\alpha,\beta$-ethylenically unsaturated dicarboxylic acid or acids chosen, may also be used.

Whenever available, the anhydrides of any of the aforementioned $\alpha,\beta$-ethylenically unsaturated polycarboxylic acids may be substituted for said acids in whole or in part.

Any of the large class of polyhydric alcohols ordinarily used in preparing polyester resins can be employed herein. While dihydric alcohols, and especially saturated aliphatic diols, are preferred as coreactants in the preparation of the polyester resins, it is not mandatory that all the polyol used be of this type in that small amounts, e.g., usually up to about 10% of the total equivalents of hydroxyl groups present in the esterification mixture of polyols having more than two hydroxyl groups, may be employed. Among the dihydric alcohols which may be employed are saturated aliphatic diols, such as ethylene glycol, propylene glycol, butylene glycol, diethylene glycol, dipropylene glycol, triethylene glycol, tetraethylene glycol, butanediol - 1,2, butanediol - 1,3, butanediol-1,4, pentanediol-1,2, pentanediol-1,3, pentanediol-1,4, pentanediol-1,5, hexanediol-1,2, hexanediol-1,3, hexanediol-1,4, hexanediol-1,5, hexanediol-1,6, neopentyl glycol, and the like, as well as mixtures thereof. Among the polyols having more than two hydroxyl groups which may be employed in minor amounts, together with the above-mentioned diols, are saturated aliphatic polyols, such as glycerol, trimethylol ethane, trimethylol propane, pentaerythritol, dipentaerythritol, arabitol, xylitol, dulcitol, adonitol, sorbitol, mannitol, and the like, as well as mixtures thereof.

Among the halogenated polyols that may be employed are 2,2'-chloromethylpropanediol - 1,3, adducts of hexachlorocyclopentadiene with unsaturated polyols, such as butenediols, pentenediols, and the like and adducts of hexachlorocyclopentadiene with polyols having three or more hydroxyl groups, one of which is etherified with an unsaturated alcohol reactive with hexachlorocyclopentadiene. Among the latter are compounds such as 3-[1,4, 5,6,7,7-hexachlorobicyclo-(2,2,1) - 5 - hepten-2-yloxy]-1,2-propanediol, which is the adduct of hexachlorocyclopentadiene with vinyl glycerol ether, 3-[1,4,5,6,7,7-hexachlorobicyclo-(2.2.1)-5-hepten-2-yl]-methoxy - 1,2 - propanediol, which is the adduct of hexachlorocyclopentadiene with allyl glycerol, adducts of hexachlorocyclopentadiene with vinyl and allyl ethers of pentaerythritol, and the like. Mixtures of these halogenated polyols may also be employed, if desired.

The esterification mixtures from which the polyester resins employed in the practice of the present invention are prepared are generally formulated so as to contain at least a stoichiometric balance between carbonyl and hydroxyl groups. Thus, where a diol and a dicarboxylic acid are employed, they are usually reacted on at least a mol-to-mol basis. In common commercial practice, a small excess of polyol, usually in the range of from about 5% to about 15% excess, is employed. This is done primarily for economic reasons, i.e., to insure a rapid rate of esterification.

The polyester resins used in the practice of the present invention are formed in the manner customarily observed in the art. Thus, the particular polycarboxylic acid or acids and polyol or polyols employed are reacted at elevated temperatures and atmospheric pressure. Since resinifying reactants of this type are prone to develop undesirable color when in contact with air at elevated temperatures, it is generally considered good practice to conduct the esterification reaction in an inert atmosphere, such as can be obtained by bubbling an inert gas, e.g., carbon dioxide, nitrogen, and the like, through the esterification mixture. The reaction temperature is not critical. Thus, the reaction will preferably be carried out at a temperature which usually will be just below the boiling point of the most volatile component of the reaction mixture, generally the polyol.

The esterification mixture should be sufficiently reacted so as to ultimately produce a high molecular weight polyester resin having of at least about 10,000 but, preferably, above about 20,000 and having an acid number not appreciably more than about 150. It is preferred to employ polyester resins having acid numbers ranging from about 20 to about 75.

Exemplary of other polymerizable monomers or prepolymers capable of effecting block copolymerization with glycolide are: anionically polymerizable caprolactones, acrylics, or polymers capped with a nucleophilic group, all prepared by methods well known in the art.

In practice, water-degradable polymers containing recurring, contiguous, polymerized, glycolide units are prepared by copolymerizing from about 2% to 35% of glycolide and, preferably, between 5% and 15% based on the weight of the comonomer, such as a polymerizable lactone or a polymerizable prepolymer. The glycolide employed may be purified by well-known procedures as by crystallization or sublimitation and copolymerized at elevated temperatures. Depending on the prepolymer or comonomer, usually a temperature of from 85° C. to 200° C. is employed. It is also good practice to incorporate a catalyst, such as dibutyl zinc, in amounts ranging from 0.001% to 1.1% based on the weight of the resultant copolymer.

The following examples are set forth for purposes of illustration only and are not to be construed as limitations on the instant invention. All parts and percentages are by weight unless otherwise specified.

EXAMPLE 1

Preparation of polyester and glycolide

There is charged to a suitable reaction flask fitted with heating mantle, stirrer, gas inlet tube, thermometer, steam-heated partial condenser followed with a total condenser and water trap the following:

| | Parts |
|---|---|
| Propylene glycol | 1,684 |
| Phthalic anhydride | 996 |
| Maleic anhydride | 1,320 |

The reactants are mixed together and heated to about 150° C. As soon as the reaction mixture has melted, a stream of carbon dioxide gas at the rate of 0.5 liter per minute, is introduced under the liquid. This carbon dioxide sparge is continued throughout the reaction. Water of esterification starts to distill over when the temperature reaches about 150° C. Distillation is continued while slowly raising the temperature until a total of 305 parts of water have been collected. The batch temperature reaches 193° C. The reaction requires a total time of approximately 20 hours.

At this point, the acid number of the reaction mixture is 34.5. The temperature of the mixture adjusts to about 150° C., and an inhibitor comprising five parts (by volume) of a 5% solution of hydroquinone in dibutyl phosphate is added. There is next introduced 325 parts of freshly recrystallized glycolide. The mixture is reacted at about 150° C. for about five hours. Resultant polymerized glycolide modified alkyd resin is then poured into a container and allowed to cool to room temperature. It is characterized as a very pale amber, hard, brittle resin, soluble in styrene and most organic solvents. The resin is combined with styrene in the ratio of two parts of resin (alkyd) to one part of styrene to form a viscous unsaturated polyester resin which possesses the following properties:

| | |
|---|---|
| Styrene content | 33 percent. |
| Specific gravity | 1.136. |
| Viscosity, G. H. | U (6.3 poise). |
| SPI Test: | |
| Gel, min. | 2.8. |
| Cure, min. | 4.8. |
| Peak, ° F. | 428. |

The resin is cast into a sheet using a cell made from two flat plates of glass separated by a ⅛-inch gasket. Employing 1% benzoyl peroxide as the catalyst, the resin is cured in a steam-heated oven. The temperature in the oven is maintained at 125° F. for the first four hours, then increased slowly over the next seven hours to 250°

F., and, finally, held at 250° F. for three hours. The resulting casting had the following properties:

Appearance _____ Transparent, colorless plastic.
Barcol hardness _____ 45 to 50.
Specific gravity _____ 1.236.
Shrinkage on curing _____ 8 percent.

A section of the above casting, approximately one inch wide by two inches long, is soaked in water at 55° C., and weight measurements are periodically made to follow the rate of water absorption. Water is found to be absorbed by the cast section steadily for the first two weeks. At this point, there was evidence of cracks forming within the casting. Water pickup continued for another week. At this point, the weight gain was approximately 5% and blisters had appeared. The weight now began to markedly decrease as water-soluble material leached out of the casting which now cracked easily and broke.

A casting made from the corresponding polyester resin, absent glycolide, is exposed to water-soaking as a control. This casting gained approximately 1.5% in weight but had shown no evidence of water-degradation.

EXAMPLE 2

A glass fiber, reinforced laminate is made employing the polymer of Example 1 above and cured in the same manner as the casting of Example 1 above and compared with a similar glass fiber laminate made with the corresponding polyester resin, absent glycolide units, in water-soak tests at 55° C. The glycolide modified polyester laminate gained weight rapidly, reached a maximum, and then began to lose weight as degradation took place. It became brittle and cracked. The control laminate, on the other hand, gained weight due to water absorption but otherwise remained unchanged.

EXAMPLE 3

The procedure of Example 1 is repeated in every detail, except that there are introduced 1,650 parts of freshly sublimed glycolide instead of 325 parts of glycolide of Example 1 above. The mixture is reacted at 150° C. for about eight hours and the resulting glycolide modified polyester alkyd resin is poured into a container to cool. The alkyd is cut with styrene at a ratio of 80 parts alkyd to 20 parts of styrene. A ⅛-inch thick casting made from this resin using 1% benzoyl peroxide catalyst is slightly hazy. It has a specific gravity of 1.3.

The above casting, approximately 1 inch by 2 inches, is soaked in water at 55° C., and weight measurements are made perodically to follow the progress of water-degradation. In two days, the sample had picked up about 2% in weight. By the third day, the plastic had started to crack and was decreasing in weight as water-degraded material leached out. After ten days of soaking in water at 55° C., the sample was badly cracked and had lost approximately 5% of its original weight. In ten days, the weight loss was 9%. A similar piece of the same casting was soaked in water at room temperature. Although the degradation process is slower, it follows the same sequence of changes as the test at 55° C. Within 15 days, the sample had gained 2% in weight and had started to form small blisters. The weight continued to increase reaching a maximum of 4.5% at 43 days. By this time, the sample was badly cracked and had started decreasing in weight due to loss of degradation products.

EXAMPLE 4

Preparation of copolymer of ε-caprolactone and glycolide

A suitable dried resin flask is charged with 500 parts (by volume) of anhydrous toluene, 102.6 parts of freshly distilled ε-caprolactone, and 11.6 parts of freshly sublimed glycolide. The solution is heated to 85° C. under an argon atmosphere and 0.20 part (by volume) of di-n-butyl zinc is added through a serum stopper seal by means of a hypodermic needle. After four hours, the resultant viscous solution is filtered through a fiber glass mat into a stirred petroleum ether bath containing enough Dry Ice to maintain the temperature at −80° C. The precipitated polymer is filtered immediately and dried in a vacuum oven at 50° C. and 0.5 mm. Hg pressure overnight. One hundred six parts of polymer having a molecular weight of about 60,000 are obtained which had a reduced viscosity of 0.95 (0.2% chloroform solution, 30° C.) and softened, under pressure, at 53° C. to 58° C.

Films of resultant polymer are produced from chloroform solutions or by melt-pressing and generally possess a hazy cast.

EXAMPLE 5

Preparation of copolymer of ε-caprolactone and lactide

The procedure of Example 4 is followed in every detail except that freshly recrystallized, d,l-lactide is substituted for glycolide. Films are prepared as in Example 4 and are noted to be transparent.

EXAMPLE 6

Preparation of homopolymer of ε-caprolactone

The homopolymer is prepared following the procedure of Example 4 in every detail except that the reaction vessel is charged with 114 parts of ε-caprolactone and omitting freshly sublimed glycolide. The resulting homopolymer has a slightly higher reduced specific viscosity of 1.1 (0.2% conc., 30° C.) and forms transparent films.

EXAMPLE 7

Wet tensile strength tests are carried out on the films resulting from each of the polymers prepared in Examples 4, 5 and 6 above, according to the method set forth in ASTM D–882–67. All the films are found to have approximately the same strength. However, when the respective films are stored under water for one month, the homopolymer (Example 6) and the copolymer of ε-caprolactone and lactide (Example 5) retain approximately 90% of their original wet strength property, whereas the copolymer of ε-caprolactone and glycolide (Example 4) lost more than about 50% of its original wet tensile strength. The latter film, when dried, became brittle, fragile, and crumpled.

The latter properties, namely, brittleness, fragility, and crumpling, are not noted with respect to the polymers of Examples 5 and 6 above.

Although polycaprolactones and polyesters have been exemplified, other thermosetting or thermoplastic resins may be advantageously employed as hereinabove indicated with attendant good results. Such thermosetting or thermoplastic resins are prepared from monomers capable of block copolymerization with glycolide. These monomers are, for instance, cyclic esters, cyclic amides, cyclic urethanes, cyclic anhydrides and cyclic ethers as well as linear olefins, linear acrylics, linear methacrylics capable of being polymerized via an anionic polymerization mechanism. Illustrative of the monomers are caprolactones, propylene oxide, butadiene, methyl-α-cyanoacrylate and glycine N-carboxyanhydride. It is to be noted that the reactivity ratios be such that blocks of polyglycolic acid are built up in the polymer and not dispersed in single units throughout the polymer chain. Further, polymerizable prepolymers may include a plurality of polymeric species exemplary of which are: polyolefins, vinyls, aromatics, phenolics, alkyds, amino urea-formaldehydes and melamine formaldehydes, polyesters, polyurethanes, acrylics, cellulosics, epoxys, nylons, acetals, polycarbonates, polyfluorocarbons, polyphenyleneoxides, polysulfones or any "living" polymer having in common a nucleophilic end group, such as alcohols, amines, or sulfhydryl, or stabilized or unsaturated anions.

We claim:
1. A water-degradable resin forming composition comprising a mixture of styrene with a glycolide modified thermosetting polyester with recurring, contiguous, polymerized glycolide units having the structure:

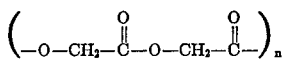

where $n$ is an integer from 1 to 250, said polyester prepared by reacting glycolide, at least one aliphatic polyhydric alcohol, and at least one unsaturated polycarboxylic acid or its anhydride.

2. The water-degradable resin forming composition according to claim 1 wherein the polymerized glycolide is present in a concentration ranging from 5% to 15%, by weight of said thermosetting polyester-resin.

3. The water-degradable resin forming composition according to claim 1 wherein the thermosetting polyester is a copolymer of propylene glycol, phthalic anhydride and maleic anhydride.

4. The water-degradable resin obtained by free radical initiated crosslinking of the composition of claim 1.

5. The water-degradable resin obtained by free radical initiated crosslinking of the composition of claim 2.

6. The water-degradable resin obtained by free radical initiated crosslinking of the composition of claim 3.

7. A process for preparing a water-degradable resin with recurring, contiguous, polymerized glycolide units according to claim 1 which comprises: effecting copolymerization of (a) a thermosetting unsaturated polyester prepolymer formed by reacting an aliphatic polyhydric alcohol and at least one unsaturated polycarboxylic acid and (b) glycolide at a temperature ranging from about 85° C. to 200° C. for from about two to about twenty hours, said glycolide being present from 2% to 35%, by weight, based on the weight of the said prepolymer, and recovering a water-degradable glycolide modified resin.

8. The process according to claim 7 wherein the thermosetting polyester resin is a copolymer of an aliphatic polyhydric alcohol and at least one organic, unsaturated polycarboxylic acid or anhydride thereof, said polymer being subsequently reacted with styrene.

9. The process according to claim 8 wherein the thermosetting polyester resin is a copolymer of propylene glycol, phthalic anhydride, and maleic anhydride.

References Cited

UNITED STATES PATENTS

| | | | |
|---|---|---|---|
| 2,089,569 | 8/1937 | Orthner et al. | 260—106 |
| 2,362,511 | 11/1944 | Teeters | 260—78 |
| 2,683,136 | 10/1950 | Higgins | 260—78.3 |
| 3,636,956 | 1/1972 | Schneider | 128—335.5 |
| 2,828,290 | 3/1958 | Caldwell | 260—76 |
| 3,502,623 | 3/1970 | Murworth et al. | 260—76 |

FOREIGN PATENTS

| | | | |
|---|---|---|---|
| 583,268 | 12/1946 | Great Britain | 260—78.3 R |
| 755,447 | 8/1956 | Great Britain | 260—78.3 R |

OTHER REFERENCES

Chujo et al., Die Makromolekulare Chemie 100, 262–266 (1967).

WILLIAM H. SHORT, Primary Examiner

E. A. NIELSEN, Assistant Examiner

U.S. Cl. X.R.

260—75 UA, 861